US 8,611,656 B2

(12) United States Patent
Kim et al.

(10) Patent No.: US 8,611,656 B2
(45) Date of Patent: Dec. 17, 2013

(54) IMAGE PROCESSING APPARATUS, IMAGE PROCESSING METHOD AND RECORDING MEDIUM FOR STORING PROGRAM TO EXECUTE THE METHOD

(75) Inventors: Duck-Soo Kim, Yeongdeungpo-gu (KR); Ilya Vol, Rosh-HaAyin (IL); Tae-Chan Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 381 days.

(21) Appl. No.: 13/113,403

(22) Filed: May 23, 2011

(65) Prior Publication Data

US 2011/0293174 A1    Dec. 1, 2011

(30) Foreign Application Priority Data

May 27, 2010  (KR) .................. 10-2010-0049828

(51) Int. Cl.
  *G06K 9/00*    (2006.01)
(52) U.S. Cl.
  USPC ......................................... 382/167
(58) Field of Classification Search
  USPC .............. 382/162–167, 254, 274–275; 345/589–611; 348/222.1, 223.1, 348/333.01, 655, 370–371; 358/1.9, 516, 358/518; 362/3–18
  See application file for complete search history.

(56) References Cited

U.S. PATENT DOCUMENTS

| 6,522,353 | B1 * | 2/2003 | Saito et al. | 348/223.1 |
| 6,909,463 | B2 * | 6/2005 | Parulski | 348/333.01 |
| 7,009,641 | B2 * | 3/2006 | Takahashi | 348/223.1 |
| 7,155,056 | B2 * | 12/2006 | Andersen | 382/164 |
| 7,604,360 | B2 * | 10/2009 | Chen et al. | 362/5 |
| 7,728,880 | B2 * | 6/2010 | Hung et al. | 348/223.1 |
| 7,872,658 | B2 * | 1/2011 | Huh et al. | 345/589 |
| 7,912,279 | B2 * | 3/2011 | Hsu et al. | 382/162 |
| 8,049,789 | B2 * | 11/2011 | Innocent | 348/223.1 |
| 8,154,612 | B2 * | 4/2012 | Quan et al. | 348/222.1 |
| 8,358,319 | B2 * | 1/2013 | Cote et al. | 345/611 |

FOREIGN PATENT DOCUMENTS

| JP | 2006270135 A | 10/2006 |
| JP | 2007097175 A | 4/2007 |
| JP | 2008219414 A | 9/2008 |
| KR | 1020070026836 A | 3/2007 |

* cited by examiner

*Primary Examiner* — Ishrat I Sherali
(74) *Attorney, Agent, or Firm* — Harness, Dickey & Pierce, P.L.C.

(57) ABSTRACT

According to example embodiments, an image processing method includes estimating, using a location-based multi-illuminant estimation unit, candidate correlated color temperature values and location values of sub-units of an image, calculating, using the location-based multi-illuminant estimation unit, a correlated color temperature (CCT) matrix based on the candidate CCT values and the location values, and performing, using a color processing unit, color processing by using the CCT matrix.

26 Claims, 7 Drawing Sheets

IMAGE PROCESSING APPARATUS, IMAGE PROCESSING METHOD AND RECORDING MEDIUM FOR STORING PROGRAM TO EXECUTE THE METHOD

CROSS-REFERENCE TO RELATED APPLICATIONS

This application claims priority under 35 U.S.C. §119 to Korean Patent Application No. 10-2010-0049828, filed on May 27, 2010, in the Korean Intellectual Property Office, the disclosure of which is incorporated herein in its entirety by reference.

BACKGROUND

Example embodiments to an image processing apparatus, an image processing method, and a recording medium for storing a program for executing the image processing method, and more particularly, to an image processing apparatus for performing a color processing of multiple light sources having different correlated color temperatures from each other, an image processing method, and a recording medium for storing a program for executing the image processing method.

In a general image signal processor (ISP), for example, an image processor of a camera, a white balance gain is applied to an entire image. However, there may be one or more kinds of correlated color temperatures (CCTs) of an illuminant in some images. Here, a general ISP performs a color processing operation by using a weighted average of the CCTs of various illuminants. However, the white balance gain with respect to the illuminant having one CCT may not be generally suitable for the CCT of other illuminants.

SUMMARY

According to example embodiments, an image processing method includes estimating, using a location-based multi-illuminant estimation unit, candidate correlated color temperature values and location values of sub-units of an image, calculating, using the location-based multi-illuminant estimation unit, a correlated color temperature (CCT) matrix based on the candidate CCT values and the location values, and performing, using a color processing unit, color processing by using the CCT matrix.

According to example embodiments, the image processing method, further includes estimating, using an illuminant estimation unit, a reference CCT value from the image. The calculating of the CCT matrix includes, refining the candidate CCT values of the sub-units of the image via at least one of a filtering process and a mapping process for mapping filtered candidate CCT to a representative CCT value by using a reference CCT value, and calculating the CCT matrix including the refined candidate CCT values and the location values.

According to example embodiments, the estimating of the candidate CCT values and the location values includes controlling a moving thumbnail window (MTW), which scans the sub-unit of the image with an x-y coordinate, to estimate the candidate CCT data of the sub-unit included in a frame of the MTW by using at least one of the x-y coordinate, the reference CCT value, and illumination information.

According to example embodiments, the refining of the candidate CCT values includes filtering the candidate CCT values to estimate the filtered CCT values, and extracting first refined CCT values that are weighted averages of the filtered candidate CCT values and the reference CCT value based on absolute differences between the filtered candidate CCT values and the reference CCT value.

According to example embodiments, the refining of the candidate CCT values further includes classifying the first refined CCT values based on a plurality of CCT value ranges, and estimating representative CCT values by converging the first refined CCT values to representative values in the plurality of CCT value ranges, filtering the representative CCT values to estimate filtered representative CCT values, and extracting second refined CCT values that are weighted averages of the filtered representative CCT values and the reference CCT value, based on absolute differences between the filtered representative CCT values and the reference CCT value.

According to example embodiments, the calculating of the CCT matrix includes calculating a refined CCT matrix including the second refined CCT values and the location values thereof.

According to example embodiments, the performing of the color processing further includes applying an automatic white balance (AWB) gain to the sub-units of the image by using the CCT matrix.

According to example embodiments, wherein the performing of the color processing further includes applying a color correction matrix (CCM) to the sub-units of the image by using the CCT matrix.

According to example embodiments, the MTW is at least equal to the sub-unit of the image.

According to example embodiments, the representative values include shadow (8000K), daylight (5500K), fluorescent (3500K), incandescent (2800K), and horizon (1800K).

According to example embodiments, an image processing apparatus includes a location-based multi-illuminant estimation unit configured to estimate candidate correlated color temperature (CCT) values and location values in a sub-unit of an image, and calculating a CCT matrix based on the candidate CCT values and the location values, and a color processing unit configured to perform a color processing by using the CCT matrix.

According to example embodiments, the image processing apparatus further includes a reference illuminant estimation unit configured to estimate a reference CCT value from the image. The location-based multi-illuminant estimation unit includes, a candidate CCT data estimation unit configured to estimate the candidate color temperature values and the location values in the sub-unit of the image, a refine unit configured to refine the candidate CCT value with respect to the sub-unit through at least one of a filtering process and a mapping process to map filtered candidate CCT to a representative CCT value by using the reference CCT value, and a CCT matrix calculation unit configured to calculate the CCT matrix including the refined CCT values and the location values.

According to example embodiments, the candidate CCT data estimation unit is configured to control a moving thumbnail window (MTW), which scans the sub-unit of the image using an x-y coordinate, to estimate the candidate CCT data of the sub-unit included in a frame of the MTW by using at least one of the x-y coordinate, the reference CCT value, and illumination information.

According to example embodiments, the refine unit includes a first refine unit for filtering the candidate CCT values to estimate the filtered CCT values, and configured to extract first refined CCT values that are weighted averages of the filtered candidate CCT values and the reference CCT based on absolute differences between the filtered candidate CCT values and the reference CCT value.

According to example embodiments, the refine unit further includes a second refine unit configured to, classify the first refined CCT values based on a plurality of CCT value ranges, and estimate representative CCT values by converging the classified CCT values to representative values in the plurality of CCT value range, perform a secondary filtering of the representative CCT values to estimate filtered representative CCT values, and extract second refined CCT values that are weighted averages of the filtered representative correlated color temperature values and the reference CCT value, based on absolute differences between the filtered representative CCT values and the reference CCT value.

According to example embodiments, the CCT matrix calculation unit calculates a refined CCT matrix including the second refined CCT values and the location values thereof.

According to example embodiments, the image processing apparatus, further includes a storage unit configured to store a lookup table that defines at least one of the filtering process and the mapping process.

According to example embodiments, the image processing apparatus of claim 11, further includes a CCM processing unit configured to apply a color correction matrix (CCM) to the sub-units of the image by using the CCT matrix.

According to example embodiments, the MTW is at least equal to the sub-unit of the image.

According to example embodiments, an image processing system includes an imaging device configured to capture input images, a reference correlated color temperature (CCT) estimation unit for estimating a reference CCT value from an input image, the image processing apparatus according to above example embodiments, a storage unit configured to store a lookup table that defines at least one of the filtering process and the mapping process, and a CCT matrix calculation unit configured to calculate the CCT matrix including refined CCT values and location values. The image processing apparatus includes the location-based multi-illuminant estimation unit having a candidate CCT data estimation unit configured to estimate candidate CCT values and location values of sub-units of the image by using the reference CCT value, and a refine unit configured to refine the candidate CCT values of the sub-units via at least one of a filtering process and a mapping process, in which the candidate CCT values are mapped with representative CCT values, by using the reference CCT value, and the color processing unit configured to apply an automatic white balance (AWB) gain and a color correction matrix (CCM) to the sub-units of the image using a CCT matrix.

According to example embodiments, an image processing method includes using a refining unit to refining candidate correlated color temperature (CCT) values of an image. The refining includes performing a first filtering operation on the candidate CCT values to estimate filtered CCT values, extracting first refined CCT values that are weighted averages of the first filtered candidate CCT values and a reference CCT value based on absolute differences between the first filtered candidate CCT values and the reference CCT value, classifying the first refined CCT values based on a plurality of CCT value ranges, and estimating representative CCT values by converging the first refined CCT values to representative values in the plurality of CCT value ranges, performing a second filtering operation on the representative CCT values to estimate filtered representative CCT values, and extracting second refined CCT values that are weighted averages of the second filtered representative CCT values and the reference CCT value based on absolute differences between the second filtered representative CCT values and the reference CCT value.

According to example embodiments, the image processing method, further includes using a candidate CCT data estimation unit to estimate candidate correlated color temperature values and location values of sub-units of the image, and using a CCT matrix calculation unit to calculate a CCT matrix based on the candidate CCT values and location values, wherein calculating the CCT matrix is further based on the refining.

According to example embodiments, the image processing method, further including using a color processing unit to perform color processing based on the calculated CCT matrix, wherein the color processing includes, applying an automatic white balance (WB) gain to the sun-units of the image using the CCT matrix, and applying a color correction matrix to the sub-units of the image using the CCT matrix.

According to example embodiments, the estimating of the candidate CCT values and the location values includes controlling a moving thumbnail window (MTW), which scans the sub-unit of the image with an x-y coordinate, to estimate the candidate CCT data of the sub-unit included in a frame of the MTW by using at least one of the x-y coordinate, the reference CCT value, and illumination information.

According to example embodiments, a computer program product including a non-transitory computer useable recording medium having computer readable program codes embodied in the medium that, when executed on a computer, cause the computer to carry out the image processing method.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
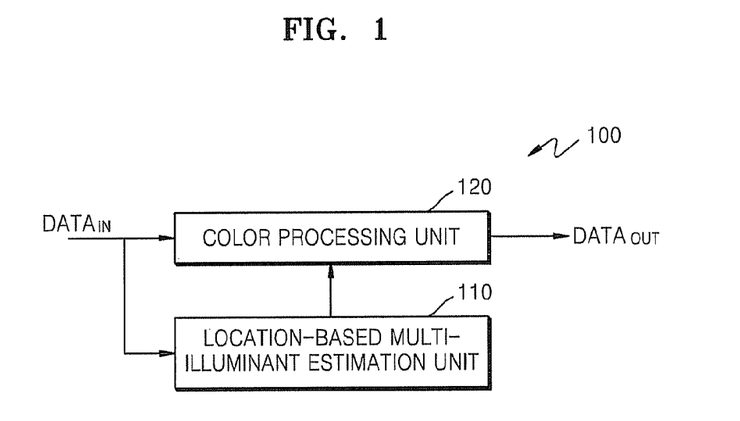
FIG. 1 is a schematic block diagram of an image processing apparatus according to example embodiments.

FIG. 1 is a schematic block diagram of an image processing apparatus 100 according to example embodiments. For example, the image processing apparatus 100 may be a digital camera, a digital video recorder, a cellular phone camera, a personal digital assistance (PDA), a personal multimedia player (PMP), or the like.

Referring to FIG. 1, the image processing apparatus 100 includes a location-based multi-illuminant estimation unit 110 and a color processing unit 120. When an image signal ($DATA_{IN}$) is input, the location-based multi-illuminant estimation unit 110 estimates a candidate correlated color temperature (CCT) value and a location value, in a sub-unit of an image, and calculates a CCT matrix based on the candidate CCT value and the location value. In addition, the color processing unit 120 performs a color processing with respect to the input image $DATA_{IN}$ by using the CCT matrix. Hereinafter, flow of data in the image processing apparatus 100 of FIG. 1 will be described as follows in more detail with reference to FIG. 2.

Figure 2:
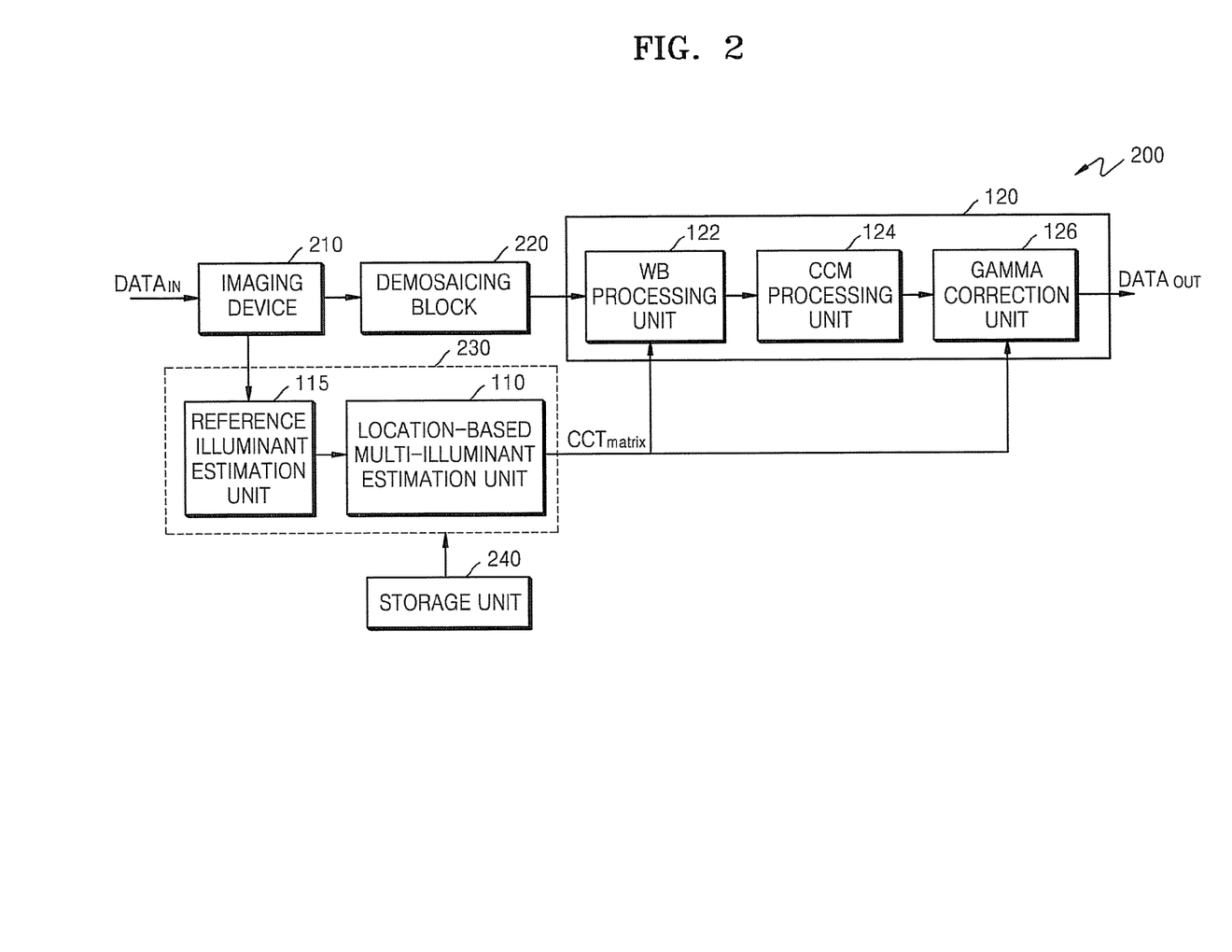
FIG. 2 is a detailed block diagram of the image processing apparatus of FIG. 1, according to example embodiments.

FIG. 2 is a detailed block diagram of the image processing apparatus 100 of FIG. 1, according to example embodiments.

Referring to FIG. 2, the image processing apparatus 200 includes an imaging device 210, a demosaicing block 220, a color processing unit 120, an illuminant estimation unit 230, and a storage unit 240.

The imaging device 210 captures images of a subject (not shown) to generate image signals. According to example embodiments, the imaging device 210 may be a complementary metal-oxide semiconductor (CMOS) sensor array or a charge-coupled device (CCD) sensor array. For example, the imaging device 210 may be an image sensor having three kinds of color filters, for example, red (R), green (G), and blue (B) color filters, and may generate R, G, and B representation of images with respect to input images. However, according to example embodiments are not limited to the above example.

An analog/digital (A/D) converter (not shown) converts an analog signal supplied from the imaging device 210 into a digital signal. For example, each of the pixels in the input image may be quantized as 14-bits pixel data. The A/D converter may not be necessary according to characteristics of the imaging device 210.

The demosaicing block 220 performs an interpolation process with respect to pixel data of one color (that is, image information of one channel) in each of the pixels by using adjacent pixel data so that each of the pixels may have R, G, and B image information (that is, image info illation of three channels). The interpolation process is referred to as demosaicing.

The color processing unit 120 performs a color processing operation on the R, G, and B pixel data of three channels that are interpolated by the demosaicing process so that the pixel data is recognized by human beings. In addition, the color processing unit 120 may include a white balance (WB) processing unit 122, a color correction matrix (CCM) processing unit 124, and/or a gamma correction unit 126. The color processing mainly includes a WB process for balancing gray levels and a color correction process for color reproduction. The color correction may include a CCM calculation for converting the interpolated R, G, and B images into objective output color spaces, and a gamma correction for correcting non-linearity. The color processing is performed by the WB processing unit 122, the CCM processing unit 124, and the gamma correction unit 126.

In addition, a display unit (not shown) that is a display device, such as a liquid crystal display (LCD), may display an output image signal $DATA_{OUT}$ supplied from the gamma correction unit 126.

In particular, the WB processing unit 122 and the CCM processing unit 124 performs WB balance processing and then CCM processing with respect to the input image $DATA_{IN}$ by using the CCT matrix output from the illuminant estimation unit 230. Detailed descriptions of the color reproduction correction process will be described later with operations of the illuminant estimation unit 230.

The illuminant estimation unit 230 may include a reference illuminant estimation unit 115 and the location-based multi-illuminant estimation unit 110. For example, if a color coordinate of a certain illuminant is equal to a color coordinate of blackbody at a certain temperature, the temperature is defined as the CCT of the illuminant. However, the color coordinates are not exactly the same as each other, CCT is defined as the correlated color temperature of the illuminant by using an approximate color coordinate. The illuminant is represented by numbers by using the CCT in order to distinguish the illuminant from each other.

The reference illuminant estimation unit 115 estimates a reference CCT value under an assumption that there is a single illuminant in an image of the image signal output from the imaging device 210. The method of estimating the reference CCT value from the image is well known in the art, and thus, detailed descriptions thereof are not provided here. For example, a grey world assumption (GWA) may be used.

Next, the location-based multi-illuminant estimation unit. 110 estimates the CCT value and the location value of the illuminant in a sub-unit in the image, and calculates the CCT including the CCT value and the location value of the illuminant. Detailed structure of the based multi-illuminant estimation unit 110 will be described later with reference to FIG. 3.

In addition, the storage unit 240 may store mapping information such as a lookup table that is needed to estimate the CCT values, and a lookup table needed to refine the CCT value.

Consequently, according to example embodiments, information of various illuminants (that is, the CCT matrix) existing in one image are found, and then, color reproductivity in, for example, a digital camera system, may be improved.

That is, a single kind of CCT information (that is, the reference CCT value) that becomes a reference of automatic white balance (AWB) and the color reproduction is not used, but info information of various illuminants existing in one image are all considered to process images.

For example, the WB processing unit 122 applies the WB gain to the R, G, and B images when the AWB process is performed in the image processing apparatus. Herein, a specific WB gain is applied to the entire image under the WB gain control in the conventional image processing apparatus. However, according to the image processing apparatus of example embodiments, the WB gain may be applied differently to each of the pixels in a two-dimensional image by using the CCT matrix. That is, the WB gains that are as many as the number of pixels may be used by using the CCT matrix. For example, if there are two kinds of illuminants in one image, an intermediate level illuminant between the two illuminants, which satisfies a trade-off between the two illuminants, is modeled, and then, the same WB gain with respect to the intermediate level illuminant is applied to the entire image in the conventional image processing apparatus. However, according to the image processing apparatus of example embodiments, two kinds of WB gains with respect to the two kinds of illuminants may be used.

Therefore, under the multiple CCT environment, the CCM processing unit 124 also performs the color reproduction process by multiplying the R, G, and B pixel data, which are white-balanced by the WB processing unit 122, by the CCT.

Hereinafter, the location-based multi-illuminant estimation unit 110 will be described in more detail with reference to FIG. 3.

Figure 3:
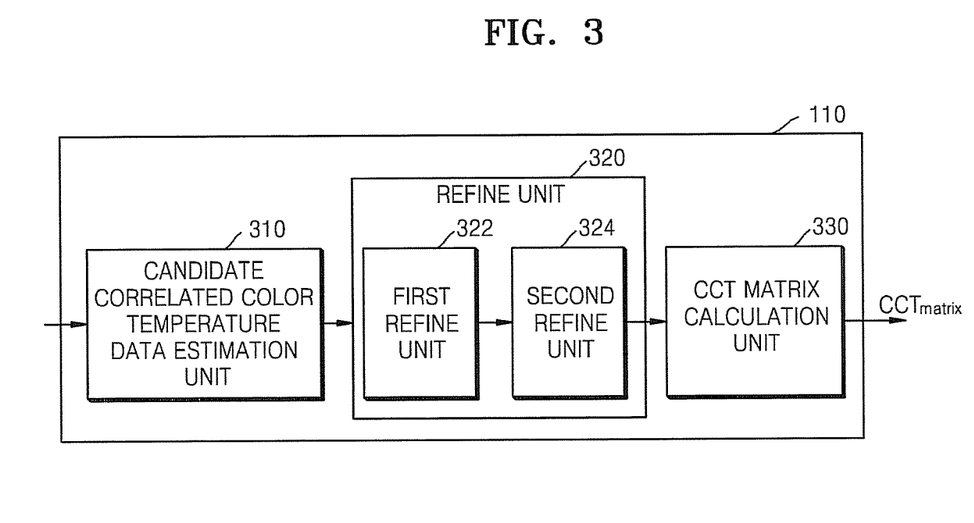
FIG. 3 is a block diagram of a location-based multi-illuminant estimating unit included in the image processing apparatus of FIG. 1, according to example embodiments.

FIG. 3 illustrates the location-based multi-illuminant estimation unit 110 of FIG. 1, according to example embodiments.

Referring to FIG. 3, the location-based multi-illuminant estimation unit 110 includes a candidate CCT data estimation unit 310 for estimating candidate CCT values and location values, and a refine unit 320 for estimating the candidate CCT values with respect to the sub-unit of the image through at least one of a filtering process and a mapping process for mapping filtered candidate CCT values to a representative color temperature value by using the reference color temperature value, and a CCT matrix calculation unit 330 for calculating the CCT matrix including the refined color temperature data. In addition, the refine unit 320 may include a first refine unit 322 and a second refine unit 324.

The candidate CCT data estimation unit 310, the first refine unit 322, and the second refine unit 324 will be described later with reference to FIGS. 4 through 6.

Figure 4:
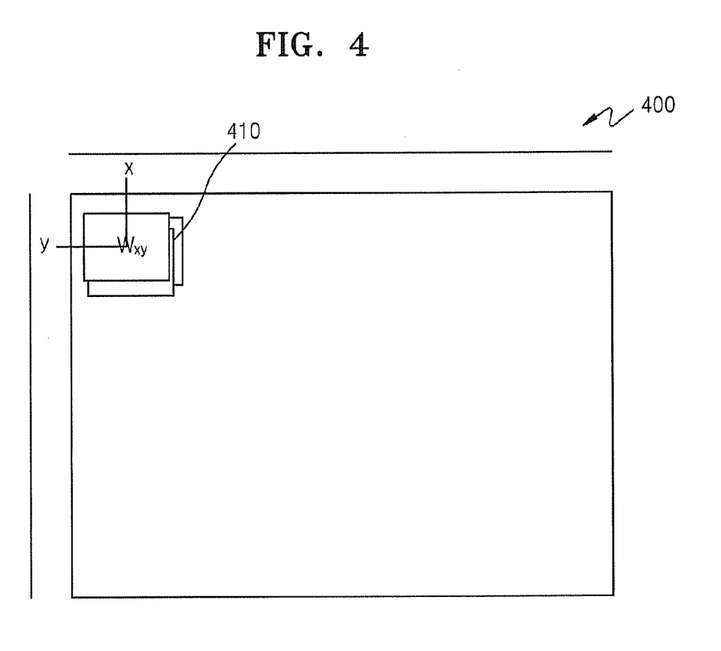
FIG. 4 is a map representing locations of illuminants having different correlated color temperature (CCT) from each other in an image, according to example embodiments.

FIG. 4 is a diagram showing a map representing locations of various illuminants having different CCTs from each other in an example image 400, according to example embodiments.

Referring to FIG. 4, a moving thumbnail window (MTW) 410 scans the image 400 by the sub-unit to estimate the candidate CCT data (candidate CCT value and location value) of the sub-frame included in a frame of the MTW window 410. Here, the MTW 410 moves in the sub-unit, and an area of the MTW 410 may be greater than the sub-frame. The sub-unit may be a pixel unit; however, example embodiments are not limited thereto. In addition, in FIG. 4, W denotes a width of the image 400 and H denotes a height of the image 400.

Here, the candidate CCT data (candidate CCT value and location value) estimated by the candidate CCT estimation unit 310 may be represented as the following Equation 1.

$$CCT_{xy} = SubAWB(W_{xy}, CCT_{global}, L)$$
$$(0 \leq x \leq W-w), (0 \leq y \leq H-h) \quad (1)$$

Here, $CCT_{xy}$ denotes the candidate CCT data (candidate CCT value and location value), and $W_{xy}$ denotes x-y coordinates of the image included in the frame of the MTW 410. In addition, $CCT_{global}$ denotes the reference CCT value, and L denotes an intensity of illumination. In addition, w is a width of the MTW 410, and h is a height of the MTW 410. Function SubAWB( ) is a function for calculating the candidate CCT value and the location value. In addition, x and y are natural numbers, and are indexes of the x and y coordinates.

Referring to FIG. 4 and Equation 1, the MTW 410 that scans the image in the sub-unit with x-y coordinates may estimate the candidate CCT data (candidate CCT value and location value) of the sub-image that is included in the frame of the WTW 410 by using the x-y coordinates, the reference CCT value ($CCT_{global}$) and the illumination L information.

When a size of the MTW 410 is w, h and a size of the image 400 is W, H, the number of the candidate CCT data (CCTxy) is W−w, H−h.

For example, it is assumed that the image 400 includes a 3×3 (W×H) pixel array and the MTW 410 has a 1×1 (w×h) pixel size, the number of candidate CCT data is 9 (3×3).

The location value estimation performed by the MTW 410 will be described as follows. Under the above assumption, the index x is in a range of 0 to 2 (W−w=3−1=2), and the index y is in a range of 0 to 2 (H−h=3-1=2). Therefore, the candidate CCT data ($CCT_{xy}$) includes $CCT_{00}$, $CCT_{10}$, $CCT_{12}$, $CCT_{01}$, $CCT_{11}$, $CCT_{21}$, $CCT_{02}$, $CCT_{12}$, and $CCT_{22}$. In addition, corresponding x-y coordinates include (0, 0), (1, 0), (1, 2), (0, 1), (1, 1), (2, 1), (0, 2), (1, 2), and (2, 2). When the x-y coordinates are found, the location values of the candidate CCTs may be estimated. However, the above method is an example, and example embodiments are not limited thereto.

Next, the method of estimating the candidate CCT values by the MTW 410 will be described as follows. The method of estimating the CCT values of the image included in the frame of the MTW 410 corresponds to the method of calculating the reference CCT. Therefore, since the method of calculating the reference CCT is well known in the art, detailed descriptions of the method of estimating the candidate CCTs are not provided here. However, there is a difference that the reference CCT is calculated with respect to the entire image while the candidate CCTs are estimated with respect to parts of the image, which are included in the frame of the MTW 410. When the CCT is estimated, the illumination L may be generally used, and accuracy of the CCT estimation may be improved by using the reference CCT.

The candidate CCT data (candidate CCT values and location values) are estimated as above. However, the candidate CCT values have a lot of fluctuation due to noise. Therefore, a refinement process is needed so that the candidate CCT values may be used in the color processing operation. Herein, the following Equations 2-1 through 2-4 represent operations of the first refine unit 322 shown in FIG. 3.

$$CCT_{smooth1} = LPF(CCT) \quad (2\text{-}1)$$

$$Distance = ABS|CCT_{smooth1} - CCT_{global1}| \quad (2\text{-}2)$$

$$W1 = LUT1(Distance) \quad (2\text{-}3)$$

$$CCT_{refine1} = CCT_{smooth1}*W1 + CCT_{global}*(1-W1) \quad (2\text{-}4)$$

Referring to Equation 2-1, the first refine unit 322 performs a first blurring operation on the candidate CCT value (CCT) by passing the candidate CCT value (CCT) through a low pass filter (LPF). Then, a smoothened candidate CCT value ($CCT_{smooth1}$) is obtained.

Referring to Equation 2-2, the first refine unit 322 calculates an absolute difference between the smoothened candidate CCT value ($CCT_{smooth1}$) and the reference CCT value ($CCT_{global}$), that is, a distance therebetween.

Referring to Equation 2-3, the first refine unit 322 calculates a weight W1 from a first lookup table (LUT1) by using the distance. The first lookup table (LUT1) may be stored in the storage unit 240, and may have the characteristics shown in FIG. 5.

Figure 5:
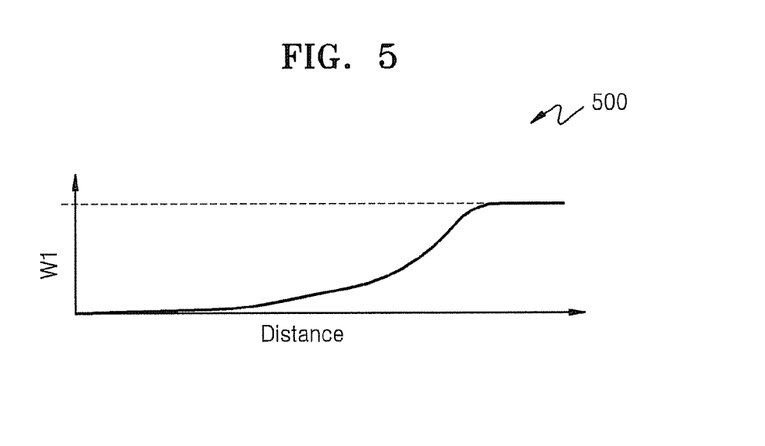
FIG. 5 is a graph of a distance-weight first lookup table, according to example embodiments.

FIG. 5 shows a graph 500 of a distance-weight first lookup table. Referring to FIG. 5, in the graph 500 of the first lookup table (LUT1), a weight W1 converges to 1 as the distance increases, and the weight W1 converges to 0 as the distance reduces.

Referring to Equation 2-4, the first refine unit 322 may calculate a first refined CCT value ($CCT_{refine1}$) that is a weighted average of the smoothened candidate CCT value ($CCT_{smooth1}$) and the reference CCT value ($CCT_{global}$), according to the obtained weight W1.

A further refining process of the first refined CCT value ($CCT_{refine1}$) may be necessary. Herein, the following Equations 3-1, 3-2, 3-3, 3-4, and 3-5 represent operations of the second refine unit 324 of FIG. 3.

$$CCT_{simple} = LUT2(CCT_{refine1}) \quad (3\text{-}1)$$

$$CCT_{smooth2} = LPF(CCT_{simple}) \quad (3\text{-}2)$$

$$Distance = ABS|CCT_{smooth2} - CCT_{global}| \quad (3\text{-}3)$$

$$W2 = LUT1(Distance) \quad (3\text{-}4)$$

$$CCT_{refine2} = CCT_{smooth2}*W2 + CCT_{global}*(1-W2) \quad (3\text{-}5)$$

Referring to Equation 3-1, the second refine unit 324 classifies the first refined CCT values ($CCT_{refine1}$) based on a plurality of CCT ranges by using a second lookup table (LUT2). In addition, the second refine unit 324 converges the classified first refined CCT values ($CCT_{refine1}$) to representative values in the plurality of CCT ranges by using the second lookup table (LUT2). Therefore, representative CCT values ($CCT_{simple}$) are obtained. Through the above processes, the complex first refined CCT values ($CCT_{refine1}$) may be simplified. The second lookup table LUT2 may be stored in the storage unit 240, and may have the characteristics shown in FIG. 6.

Figure 6:
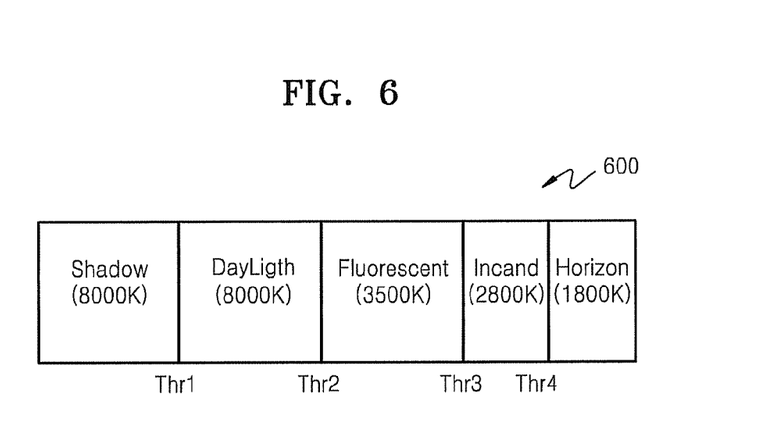
FIG. 6 is a diagram illustrating a second lookup table in which a representative value is mapped according to ranges of CCT values, according to example embodiments.

FIG. 6 is a diagram showing the second lookup table (LUTZ) 600 in which representative values are mapped to the first refined CCT values according to the CCT ranges.

Referring to FIG. 6, in the second lookup table (LUT2) 600, designated representative values may include, for example, shadow (8000K), daylight (5500K), fluorescent (3500K), incandescent (2800K), and horizon (1800K).

Processes after Equation 3-1 Correspond to Equation 2.

That is, referring to Equation 3-2, the second refine unit 324 performs a second blurring operation by passing the representative CCT values ($CCT_{simple}$) through the LPF. Then, smoothened representative CCT values ($CCT_{smooth2}$) are obtained.

Referring to Equation 3-3, the second refine unit 324 calculates absolute differences, that is, distances between the smoothened representative CCT values ($CCT_{smooth2}$) and the reference CCT value ($CCT_{global}$).

Referring to Equation 3-4, the second refine unit 324 calculates a weight W2 from the first lookup table (LUT1) by using the distances. The first lookup table (LUT1) may be stored in the storage unit 240, and may have the characteristics shown in FIG. 5. As described above, the weight W2 converges to 1 as the distance increases, and the weight W2 converges to 0 as the distance reduces.

Referring to Equation 3-5, the second refine unit 324 may calculate second refined CCT values ($CCT_{refine2}$) that are weighted averages between the smoothened representative CCT values ($CCT_{smooth2}$) and the reference CCT values ($CCT_{global}$) according to the obtained weight W2.

Referring to FIG. 3, the CCT matrix calculation unit 330 may calculate the CCT matrix including the refined CCT data (second refined CCT values and the location values thereof). In addition, as described above, the AWB gain and the CCM may be applied to the image by using the CCT matrix. If the second refined CCT values in the CCT matrix are the same as each other, that is, if the CCT values that are used in the color processing are the same as each other, the same CCT value may be the reference CCT value estimated by the reference illuminant estimation unit 115.

Figure 7:
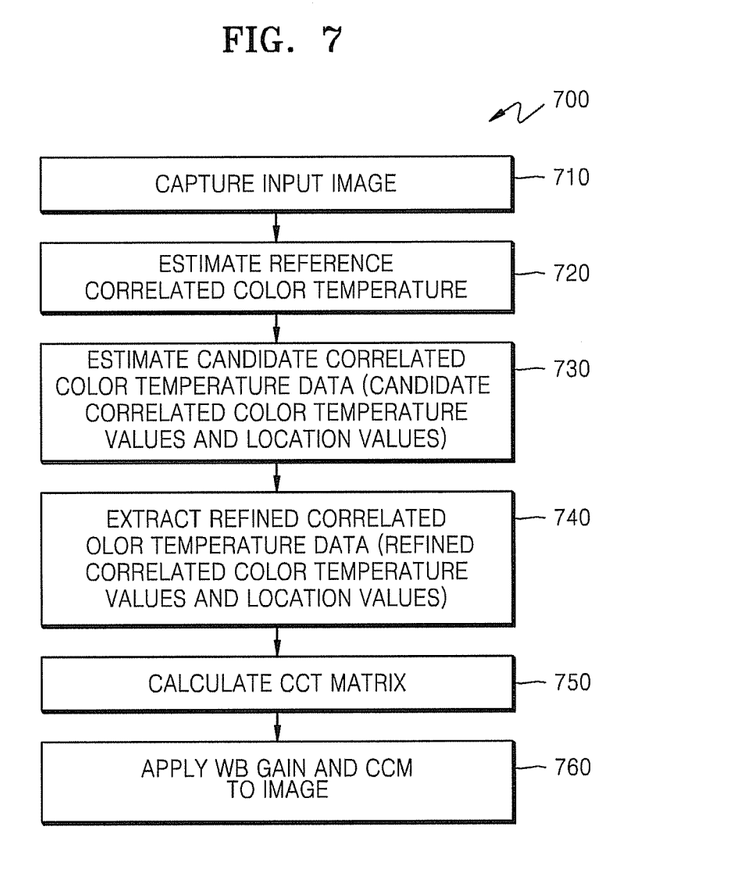
FIG. 7 is a flowchart illustrating an image processing method, according to example embodiments.

FIG. 7 is a flowchart illustrating an image processing method 700, according to example embodiments.

Referring to FIG. 7, the image processing method 700 includes imaging an input image (S710), estimating a reference CCT from one image (S720), estimating candidate CCT data (candidate CCT values and location values) in a sub-unit of the image (S730), refining the candidate CCT value with respect to the sub-unit through at least one of the filtering process and the mapping process by using the reference CCT value, and extracting the refined CCT data (refined CCT value and location value) (S740), calculating a CCT matrix including the refined CCT data (refined CCT values and location values) (S750), and applying the AWB gain and the CCM to the image by using the CCT matrix (S780).

In addition, the process of estimating the candidate CCT data (candidate CCT values and location values) (S730) may include allowing the MTW 410, which scans the sub-unit of the image with x-y coordinates, to estimate candidate CCT data (candidate correlated color temperature values and location values) of the sub-unit included in the frame of the MTW 410 by using at least one of the x-y coordinates, the reference CCT value, and the illumination L information. The sub-unit may be a pixel unit.

Figure 8:
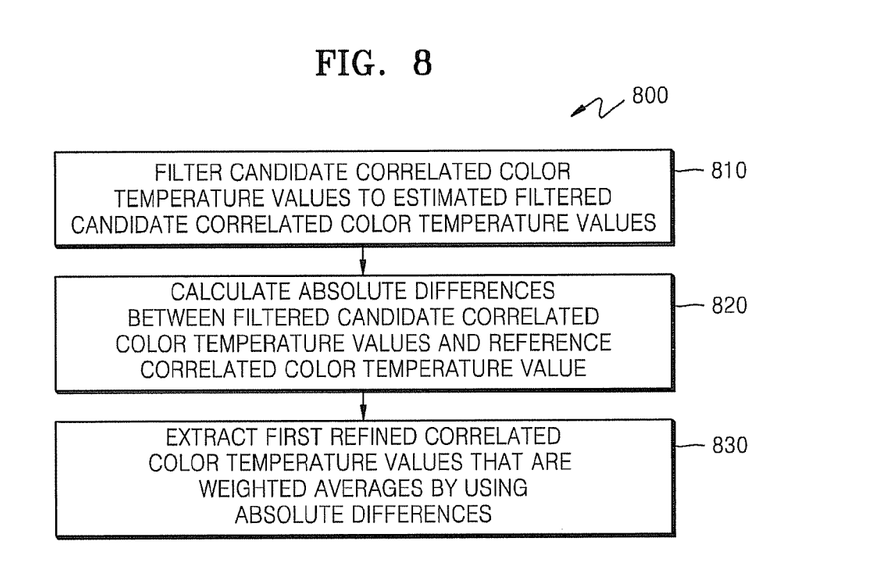
FIG. 8 is a flowchart illustrating a process of extracting refined CCT data, in the image processing method illustrated in FIG. 7, according to example embodiments.

FIG. 8 is a flowchart illustrating a process of extracting the refined CCT data (refined CCT values and location values) in the image processing method 700 of FIG. 7, according to example embodiments.

Referring to FIG. 8, the process of extracting the refined CCT data (refined CCT values and location values) includes estimating filtered candidate CCT values by filtering the candidate CCT values (S810), calculating absolute differences between the filtered candidate CCT values and the reference CCT value (S820), and extracting the first refined CCT values that are weighted averages between the filtered candidate CCT values and the reference CCT value (S830). The filtering process may be a smoothing process by using a LPF; however, example embodiments are not limited thereto.

Figure 9:
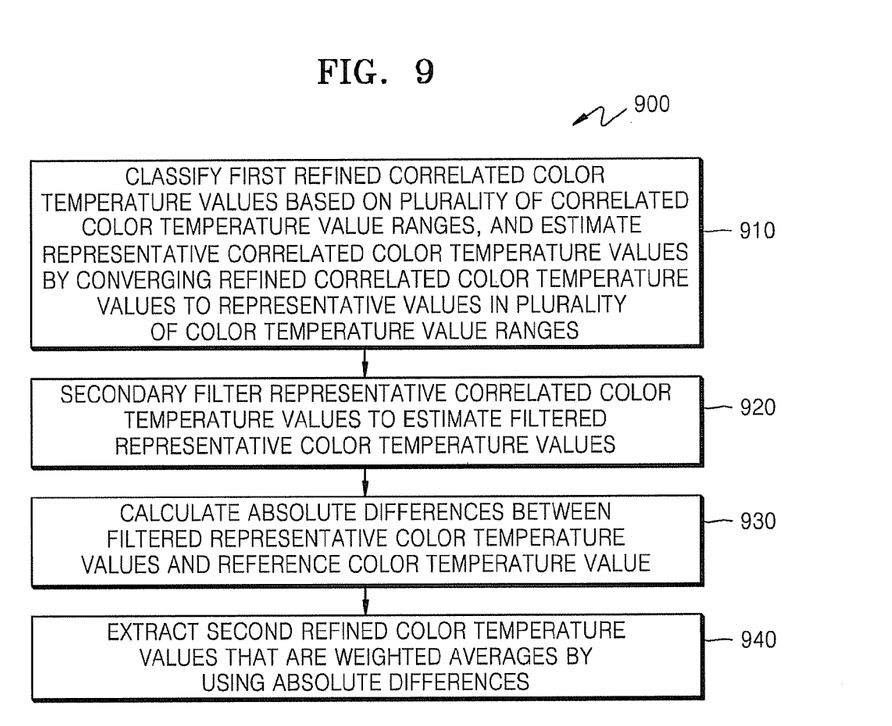
FIG. 9 is a flowchart illustrating a processing of extracting refined CCT data, in the image processing method illustrating in FIG. 7, according to example embodiments.

FIG. 9 is a flowchart illustrating the process of extracting the refined CCT data (refined CCT values and location values) in the image processing method 700 of FIG. 7, according to example embodiments.

Referring to FIG. 9, the process of extracting the refined CCT data (refined CCT values and location values) 900 includes classifying the first refined CCT values based on a plurality of CCT value ranges, and estimating representative CCT values, which are converged to representative values of the plurality of CCT value ranges (S910), estimating filtered representative CCT values by secondary filtering the converged representative CCT values (S920), calculating absolute differences between the filtered representative CCT values and the reference CCT value (S930), and extracting second refined CCT values that are weighted averages between the filtered representative CCT values and the reference CCT value by using the absolute difference (S940).

The image processing method illustrated in FIGS. 7 through 9 are similar to the descriptions about the image processing apparatus described with reference to FIGS. 1 through 6, and thus, detailed descriptions of the method are not provided here.

The program for executing the embodiments of the image processing method according to example embodiments can be implemented on a recording medium. The recording medium may be a memory (not shown), or other additional recording media. Examples of the recording medium include magnetic storage media (e.g., ROM, floppy disks, hard disks, etc.), optical recording media (e.g., CD-ROMs, or DVDs), etc.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An image processing method comprising:
    estimating, using a location-based multi-illuminant estimation unit, candidate correlated color temperature values and location values of sub-units of an image;
    calculating, using the location-based multi-illuminant estimation unit, a correlated color temperature (CCT) matrix based on the candidate CCT values and the location values; and
    performing, using a color processing unit, color processing by using the CCT matrix.

2. The image processing method of claim 1, further comprising:
    estimating, using an illuminant estimation unit, a reference CCT value from the image, wherein the calculating of the CCT matrix includes,
        refining the candidate CCT values of the sub-units of the image via at least one of a filtering process and a mapping process for mapping filtered candidate CCT to a representative CCT value by using a reference CCT value; and
        calculating the CCT matrix including the refined candidate CCT values and the location values.

3. The image processing method of claim 2, wherein the estimating of the candidate CCT values and the location values comprises:
    controlling a moving thumbnail window (MTW), which scans the sub-unit of the image with an x-y coordinate, to estimate the candidate CCT data of the sub-unit included in a frame of the MTW by using at least one of the x-y coordinate, the reference CCT value, and illumination information.

4. The image processing method of claim 3, wherein the refining of the candidate CCT values comprises:
    filtering the candidate CCT values to estimate the filtered CCT values; and
    extracting first refined CCT values that are weighted averages of the filtered candidate CCT values and the reference CCT value based on absolute differences between the filtered candidate CCT values and the reference CCT value.

5. The image processing method of claim 4, wherein the refining of the candidate CCT values further comprises:
    classifying the first refined CCT values based on a plurality of CCT value ranges, and estimating representative CCT values by converging the first refined CCT values to representative values in the plurality of CCT value ranges;
    filtering the representative CCT values to estimate filtered representative CCT values; and
    extracting second refined CCT values that are weighted averages of the filtered representative CCT values and the reference CCT value, based on absolute differences between the filtered representative CCT values and the reference CCT value.

6. The image processing method of claim 5, wherein the calculating of the CCT matrix comprises:
    calculating a refined CCT matrix including the second refined CCT values and the location values thereof.

7. The image processing method of claim 1, wherein the performing of the color processing further comprises:
    applying an automatic white balance (AWB) gain to the sub-units of the image by using the CCT matrix.

8. The image processing method of claim 1, wherein the performing of the color processing further comprises:
    applying a color correction matrix (CCM) to the sub-units of the image by using the CCT matrix.

9. The image processing method of claim 3, wherein the MTW is at least equal to the sub-unit of the image.

10. The image processing method of claim 5, wherein the representative values comprise shadow (8000K), daylight (5500K), fluorescent (3500K), incandescent (2800K), and horizon (1800K).

11. An image processing apparatus comprising:
    a location-based multi-illuminant estimation unit configured to estimate candidate correlated color temperature (CCT) values and location values in a sub-unit of an image, and calculating a CCT matrix based on the candidate CCT values and the location values; and
    a color processing unit configured to perform a color processing by using the CCT matrix.

12. The image processing apparatus of claim 11, further comprising a reference illuminant estimation unit configured to estimate a reference CCT value from the image,
wherein the location-based multi-illuminant estimation unit includes,
a candidate CCT data estimation unit configured to estimate the candidate color temperature values and the location values in the sub-unit of the image;
a refine unit configured to refine the candidate CCT value with respect to the sub-unit through at least one of a filtering process and a mapping process to map filtered candidate CCT to a representative CCT value by using the reference CCT value; and
a CCT matrix calculation unit configured to calculate the CCT matrix including the refined CCT values and the location values.

13. The image processing apparatus of claim 12, wherein the candidate CCT data estimation unit is configured to control a moving thumbnail window (MTW), which scans the sub-unit of the image using an x-y coordinate, to estimate the candidate CCT data of the sub-unit included in a frame of the MTW by using at least one of the x-y coordinate, the reference CCT value, and illumination information.

14. The image processing apparatus of claim 13, wherein the refine unit comprises:
a first refine unit for filtering the candidate CCT values to estimate the filtered CCT values, and configured to extract first refined CCT values that are weighted averages of the filtered candidate CCT values and the reference CCT based on absolute differences between the filtered candidate CCT values and the reference CCT value.

15. The image processing apparatus of claim 14, wherein the refine unit further comprises:
a second refine unit configured to,
classify the first refined CCT values based on a plurality of CCT value ranges, and estimate representative CCT values by converging the classified CCT values to representative values in the plurality of CCT value range,
perform a secondary filtering of the representative CCT values to estimate filtered representative CCT values, and
extract second refined CCT values that are weighted averages of the filtered representative correlated color temperature values and the reference CCT value, based on absolute differences between the filtered representative CCT values and the reference CCT value.

16. The image processing apparatus of claim 15, wherein the CCT matrix calculation unit calculates a refined CCT matrix including the second refined CCT values and the location values thereof.

17. The image processing apparatus of claim 11, further comprising:
a storage unit configured to store a lookup table that defines at least one of the filtering process and the mapping process.

18. The image processing apparatus of claim 11, further comprising:
a CCM processing unit configured to apply a color correction matrix (CCM) to the sub-units of the image by using the CCT matrix.

19. The image processing method of claim 13, wherein the MTW is at least equal to the sub-unit of the image.

20. An image processing system comprising:
an imaging device configured to capture input images;
a reference correlated color temperature (CCT) estimation unit for estimating a reference CCT value from an input image;
the image processing apparatus of claim 11, wherein the image processing apparatus includes
the location-based multi-illuminant estimation unit having a candidate CCT data estimation unit configured to estimate candidate CCT values and location values of sub-units of the image by using the reference CCT value, and a refine unit configured to refine the candidate CCT values of the sub-units via at least one of a filtering process and a mapping process, in which the candidate CCT values are mapped with representative CCT values, by using the reference CCT value, and
the color processing unit configured to apply an automatic white balance (AWB) gain and a color correction matrix (CCM) to the sub-units of the image using a CCT matrix;
a storage unit configured to store a lookup table that defines at least one of the filtering process and the mapping process; and
a CCT matrix calculation unit configured to calculate the CCT matrix including refined CCT values and location values.

21. An image processing method comprising:
using a refining unit to refining candidate correlated color temperature (CCT) values of an image, wherein the refining includes,
performing a first filtering operation on the candidate CCT values to estimate filtered CCT values;
extracting first refined CCT values that are weighted averages of the first filtered candidate CCT values and a reference CCT value based on absolute differences between the first filtered candidate CCT values and the reference CCT value;
classifying the first refined CCT values based on a plurality of CCT value ranges, and estimating representative CCT values by converging the first refined CCT values to representative values in the plurality of CCT value ranges;
performing a second filtering operation on the representative CCT values to estimate filtered representative CCT values; and
extracting second refined CCT values that are weighted averages of the second filtered representative CCT values and the reference CCT value based on absolute differences between the second filtered representative CCT values and the reference CCT value.

22. The image processing method of claim 21, further comprising:
using a candidate CCT data estimation unit to estimate candidate correlated color temperature values and location values of sub-units of the image; and
using a CCT matrix calculation unit to calculate a CCT matrix based on the candidate CCT values and location values, wherein calculating the CCT matrix is further based on the refining.

23. The image processing method of claim 22, further comprising:
using a color processing unit to perform color processing based on the calculated CCT matrix, wherein the color processing includes,
applying an automatic white balance (WB) gain to the sun-units of the image using the CCT matrix, and
applying a color correction matrix to the sub-units of the image using the CCT matrix.

24. The image processing method of claim 22, wherein the estimating of the candidate CCT values and the location values comprises:
    controlling a moving thumbnail window (MTW), which scans the sub-unit of the image with an x-y coordinate, to estimate the candidate CCT data of the sub-unit included in a frame of the MTW by using at least one of the x-y coordinate, the reference CCT value, and illumination information.

25. A computer program product comprising a non-transitory computer useable recording medium having computer readable program codes embodied in the medium that, when executed on a computer, cause the computer to carry out the method as claimed in claim 1.

26. A computer program product comprising a non-transitory computer useable recording medium having computer readable program codes embodied in the medium that, when executed on a computer, cause the computer to carry out the method as claimed in claim 21.

* * * * *